UNITED STATES PATENT OFFICE.

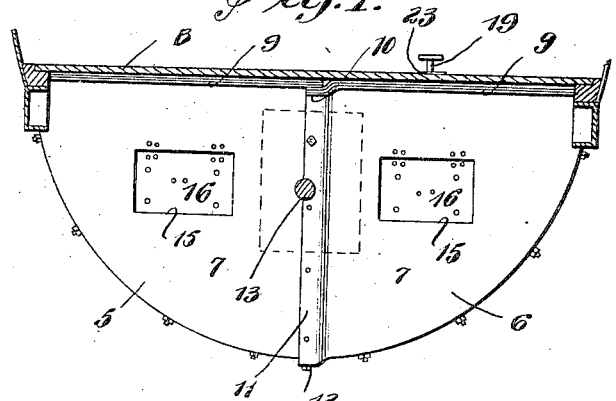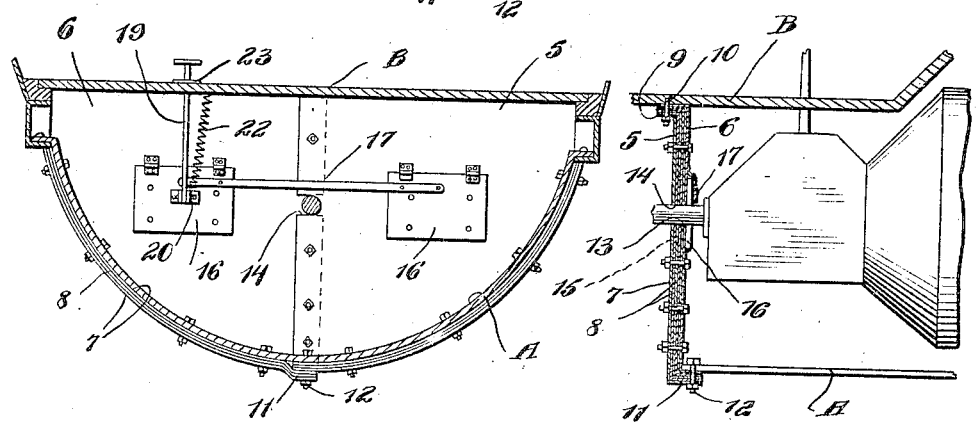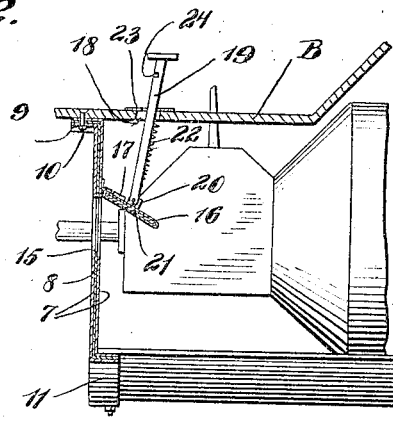

FRANK W. ARMSTRONG, OF SALINA, KANSAS.

END SHIELD FOR AUTOMOBILE-DUSTPANS.

1,377,795. Specification of Letters Patent. Patented May 10, 1921.

Application filed March 24, 1920. Serial No. 368,453.

*To all whom it may concern:*

Be it known that I, FRANK W. ARMSTRONG, a citizen of the United States, residing at Salina, in the county of Saline and State of Kansas, have invented certain new and useful Improvements in End Shields for Automobile-Dustpans, of which the following is a specification.

The invention relates to an automobile attachment and more particularly to the class of air shields or dust pan ends for use in motor vehicles.

The primary object of the invention is the provision of a shield or end of this character, wherein the same can be mounted to cover the rear opening between the engine and dust pan within an automobile for preventing cold air passing through said opening, which would result in the freezing of the water in the water cooling system during extremely cold or winter weather.

Another object of the invention is the provision of a shield or end of this character wherein windows are provided and adapted to be normally closed by shutters, which latter can be operated for the opening of the windows by an operator of the automobile so that air can be admitted between the engine and dust pan rearwardly of the same should it become necessary by reason of the overheating of the engine and thus enabling the cooling of the same by the circulation of air about said engine.

A further object of the invention is the provision of a shield or end of this character, wherein the same is constructed so as to permit the convenient mounting of the same beneath the floor of the automobile body and connected with the dust pan beneath the engine, or the said shield or end can be removed when the occasion requires; thus the latter is adaptable for use in winter weather or can be removed during summer weather and in the use it will minimize the chances of the freezing of the water-cooling system of the engine during cold weather.

A still further object of the invention is the provision of a shield or end of this character which is extremely simple in construction, readily and easily mounted in the automobile, thoroughly reliable and efficient in its purpose, under the control of the operator of the automobile for the admission of air between the dust pan and engine when the occasion requires, and is inexpensive to manufacture and install.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1 is a fragmentary, transverse sectional view through an automobile taken rearwardly of the dust pan and engine, showing the shield or end construction in accordance with the invention, in elevation.

Fig. 2 is a view similar to Fig. 1, looking toward the opposite side of the shield or end.

Fig. 3 is a fragmentary vertical longitudinal sectional view through the shield.

Fig. 4 is a view similar to Fig. 3, taken through one of the windows in open position, and showing in detail the foot lever for controlling the same.

Similar reference characters indicate corresponding parts throughout the several views in the drawing.

Referring to the drawing in detail, A designates generally the dust pan which extends beneath the engine and for a distance longitudinally of the chassis of an automobile, while B designates a portion of the floor of the body of the automobile, the dust pan being bolted or otherwise secured to the chassis of the latter and is closed at its front, the rear end being usually open, so that air will enter the opening between the dust pan about the engine from the rear thereof. Adapted to be mounted beneath the floor B to close the opening at the rear end of the dust pan A is a shield or end for said dust pan.

The shield or end comprises two sections 5 and 6 respectively, the same being identical to each other and each is formed from inner and outer metal sheets 7 and an intermediate asbestos or paper sheet 8, the sections 5 and 6 being shaped correspondingly to the opening at the rear end of the dust pan A for closing said opening. The sections 5 and 6 at their upper ends are formed with flanges 9 which are bolted or otherwise secured to the floor B at the under side thereof, while said sections overlap each other at their inner meeting edges and are detachably fastened together through the medium of removable bolts 10 while the lower portions of said sections are rounded correspondingly to the shape of the dust pan A with flanges 11, which latter are detachably fastened to the rear end of the dust pan A through the medium of removable bolts 12, which engage the flange 11 and the rear end of said dust pan.

It will be apparent that by fastening the sections 5 and 6 to the floor B and to the rear end of the dust pan A in their overlapped relation to each other, the opening rearwardly of the engine between said dust pan A and the same will be closed to exclude air entering through this opening and thereby minimizing the chances of the freezing of the water cooling system of the automobile.

The overlapped meeting edges of the sections 5 and 6 are cut away to provide suitable gaps 13 and 14, respectively, adapted to register with each other for accommodating the propeller shaft of the driving mechanism for the automobile.

Formed in the sections 5 and 6 are suitable windows 15, while hinged to the said sections are swinging shutters 16, which are normally in closed position. Connecting the shutters 16 together, is a bar 17, so that on moving one of the shutters 16, the other shutter will move therewith. Thus both shutters can be operated simultaneously.

Projecting and working through a suitable guide slot 18 in the floor B is a foot lever 19, the same being pivoted in a bearing 20 carried on one of the shutters 16, while engaged with the pivot 21, connecting said lever 19 with the bearing 20 is one end of a coiled retractile spring 22, the other end of which is suitably fastened to the floor B at the under side thereof and this spring serves to tension the shutters 16 for the automatic opening thereof when the lever 19 is released, the lever being latched in position for sustaining the shutters 16 in normally closed position, in a manner presently described.

Mounted above the slot 18 in the floor B is a keeper plate 23, the same being slotted correspondingly to the slot 18 to allow the lever 19 to work through said plate, the lever 19 being formed with a latching notch 24, which engages the keeper plate 23 at one end of the slot therein and in this manner the said lever when depressed and moved in one direction can be brought into locking engagement with the keeper plate 23 and thus hold the shutters 16, closed relative to the windows 15, against the resistance of the spring 22, which automatically opens said shutters 16 on freeing the foot lever 19, which is controlled by the foot of the operator of the automobile.

In the use of the shield or end for the dust pan A when the shutters 16 are closed, air is excluded from entrance rearwardly of the motor in the automobile about the dust pan A and thus cooling the motor and the water-cooling system thereby minimizing the chances of the freezing of the same during extreme cold or winter weather.

Now when the shutters 16 are open, which are under the control of the operator of the automobile, air can be admitted through the windows 15 in the shield or end for the dust pan so as to permit the cooling of the motor and the water-cooling system, should the occasion require, when operating the automobile in cold or winter weather and thus avoiding the over-heating of the engine.

Should it be found in the use of the automobile during summer weather that the engine becomes quickly overheated, due to the use of the shield or end for the dust pan the latter can be readily removed by detaching the sections 5 and 6 from each other and from the floor B and dust pan A, the said shield or end being made in two sections for this purpose.

What is claimed is:

1. A shield of the character described, comprising a pair of sections adapted to be mounted in an automobile rearwardly of the engine between the same and the dust pan for closing the rear portion of the latter, each section having a window, shutters closing said windows, and foot operated means for manipulating the doors.

2. A shield of the character described, comprising a pair of sections adapted to be mounted in an automobile rearwardly of the engine between the same and the dust pan for closing the rear portion of the latter, each section having a window, shutters closing said windows, foot operated means for manipulating the shutters, each section being formed with outer metal sheets, and an intermediate fiber sheet, and means for latching the foot operated means to hold the shutters closed.

3. A shield of the character described, comprising a pair of sections adapted to be mounted in an automobile rearwardly of the engine between the same and the dust pan for closing the rear portion of the latter, each section having a window, shutters closing said windows, foot operated means for manipulating the shutters, each section being formed with outer metal sheets, and an intermediate fiber sheet, means for latching the foot operated means to hold the shutters closed, and spring means connected with the shutters to open the same on releasing the foot means.

4. A shield of the character described, comprising a pair of sections adapted to be mounted in an automobile rearwardly of the engine between the same and the dust pan for closing the rear portion of the latter, each section having a window, shutters closing said windows, foot operated means for manipulating the shutters, each section being formed with outer metal sheets, and an intermediate fiber sheet, means for latching the foot operated means to hold the shutters closed, spring means connected with the doors to open the same on releasing the foot means, and means for detachably fastening the sections together and to the dust pan and superimposed floor of the automobile.

In witness whereof, I affix my signature hereto.

FRANK W. ARMSTRONG.